US012443992B2

(12) United States Patent
Deuel et al.

(10) Patent No.: US 12,443,992 B2
(45) Date of Patent: Oct. 14, 2025

(54) GENERATING AND ISSUING SECONDARY DIGITAL ASSETS BASED ON OWNERSHIP OF PRIMARY ASSETS

(71) Applicant: Disney Enterprises, Inc., Burbank, CA (US)

(72) Inventors: Matthew A. Deuel, Playa Vista, CA (US); Steven M. Chapman, Thousand Oaks, CA (US); Alif Khalfan, Redwood City, CA (US)

(73) Assignee: Disney Enterprises, Inc., Burbank, CA (US)

( * ) Notice: Subject to any disclaimer, the term of this patent is extended or adjusted under 35 U.S.C. 154(b) by 286 days.

(21) Appl. No.: 17/738,942

(22) Filed: May 6, 2022

(65) Prior Publication Data

US 2022/0358186 A1    Nov. 10, 2022

Related U.S. Application Data

(60) Provisional application No. 63/185,834, filed on May 7, 2021.

(51) Int. Cl.
*G06Q 40/04* (2012.01)
*G06F 21/10* (2013.01)
(Continued)

(52) U.S. Cl.
CPC .............. *G06Q 40/04* (2013.01); *G06F 21/10* (2013.01); *H04L 9/50* (2022.05); *G06N 20/00* (2019.01)

(58) Field of Classification Search
CPC ......... G06Q 40/04; G06F 21/10; G06F 21/12; H04L 9/50; G06N 20/00; G06N 20/20
See application file for complete search history.

(56) References Cited

U.S. PATENT DOCUMENTS 11,501,370 B1 * 11/2022 Paya ................... G06Q 20/3676
2018/0198617 A1 * 7/2018 Drouin ................. H04L 9/3213
(Continued)

FOREIGN PATENT DOCUMENTS

| CN | 114020846 A | 2/2022 |
|---|---|---|
| KR | 102343025 B1 | 12/2021 |

OTHER PUBLICATIONS

Nicholas Rossolillo, "Best Blockchain and Cryptocurrency Stocks for Dividends," The Motley Fool, Dated Jan. 17, 2022, pp. 1-5.
(Continued)

*Primary Examiner* — Patrick McAtee
*Assistant Examiner* — Vincent I Idiake
(74) *Attorney, Agent, or Firm* — Farjami & Farjami LLP

(57) ABSTRACT

Certain aspects of the present disclosure provide techniques for generating and issuing secondary digital assets based on ownership of primary assets. These techniques include determining that a recipient owns a first asset relating to an entity, and identifying a second asset relating to the entity, where the second asset includes a token and an associated digital asset, and where information relating to the second asset is included in a blockchain. The techniques further include, based on the determining that the recipient owns the first asset, distributing the second asset to the recipient, including recording data in the blockchain, the data relating to distribution of the second asset to the recipient. The techniques further include modifying the second asset based on a change relating to the first asset.

20 Claims, 8 Drawing Sheets

(51) Int. Cl.
*G06N 20/00* (2019.01)
*H04L 9/00* (2022.01)

(56) References Cited

U.S. PATENT DOCUMENTS

| | | |
|---|---|---|
| 2019/0266650 A1 | 8/2019 | Chapman et al. |
| 2019/0287175 A1 | 9/2019 | Hill et al. |
| 2020/0005284 A1* | 1/2020 | Vijayan ................. G06Q 20/065 |
| 2020/0186338 A1* | 6/2020 | Andon .................... G06F 7/588 |
| 2020/0342539 A1* | 10/2020 | Doney ............... G06Q 20/3829 |
| 2021/0150626 A1* | 5/2021 | Robotham .......... H04L 63/0442 |
| 2022/0122050 A1* | 4/2022 | Pacella ................. H04L 63/108 |
| 2022/0138849 A1* | 5/2022 | Henson .................. G06Q 40/04 |
| | | 705/37 |
| 2022/0366022 A1* | 11/2022 | Goldston ................ G06F 21/64 |
| 2023/0196341 A1* | 6/2023 | Quigley ............. G06Q 30/0631 |
| | | 705/65 |

OTHER PUBLICATIONS

Josh Hamilton, "Could Gamestop Issue an NFT Dividend?," CloudTweaks, Date Accessed: Mar. 30, 2022, pp. 1-7.
Unkown, "MS Token to Dividend an NFT," Millennium Fine Art Inc., dated Mar. 4, 2022, pp. 1-4.
Ryan Cowdrey, "NFT Dividends—The First Corporate-Issued NFT Dividend," Victory Is Never Merciless, LLC, Dated Aug. 3, 2021, pp. 1-5.

* cited by examiner

308

GENERATING AND ISSUING SECONDARY DIGITAL ASSETS BASED ON OWNERSHIP OF PRIMARY ASSETS

CROSS-REFERENCE TO RELATED APPLICATIONS

This application claims benefit of U.S. Provisional Patent Application Ser. No. 63/185,834 filed on May 7, 2021. The aforementioned related patent application is herein incorporated by reference in its entirety.

BACKGROUND

Entitlement to a benefit can be tied to ownership of another asset. For example, shareholders of a publicly traded company may be entitled to a dividend based on their ownership of corporate entity stock (e.g., an annual or semi-annual dividend). This dividend provides a benefit to shareholders, and incentivizes ownership of the stock. Shareholders may also receive other, less tangible benefits. For example, shareholders may receive physical stock certificates which can be collected and displayed.

SUMMARY

Embodiments include a method. The method includes determining that a recipient owns a first asset relating to an entity. The method further includes identifying a second asset relating to the entity, where the second asset includes a token and an associated digital asset, and where information relating to the second asset is included in a blockchain. The method further includes, based on the determining that the recipient owns the first asset, distributing the second asset to the recipient, including recording data in the blockchain, the data relating to distribution of the second asset to the recipient. The method further includes modifying the second asset based on a change relating to the first asset.

Embodiments further include a non-transitory computer-readable medium containing computer program code that, when executed by operation of one or more computer processors, performs operations. The operations include determining that a recipient owns a first asset relating to an entity. The operations further include identifying a second asset relating to the entity, where the second asset includes a token and an associated digital asset, and where information relating to the second asset is included in a blockchain. The operations further include, based on the determining that the recipient owns the first asset, distributing the second asset to the recipient, including recording data in the blockchain, the data relating to distribution of the second asset to the recipient. The operations further include modifying the second asset based on a change relating to the first asset.

Embodiments further include a system, including a computer processor and a memory having instructions stored thereon which, when executed on the computer processor, performs operations. The operations include determining that a recipient owns a first asset relating to an entity. The operations further include identifying a second asset relating to the entity, where the second asset includes a token and an associated digital asset, and where information relating to the second asset is included in a blockchain. The operations further include, based on the determining that the recipient owns the first asset, distributing the second asset to the recipient, including recording data in the blockchain, the data relating to distribution of the second asset to the recipient. The operations further include modifying the second asset based on a change relating to the first asset.

BRIEF DESCRIPTION OF THE DRAWINGS

So that the manner in which the above recited aspects are attained and can be understood in detail, a more particular description of embodiments described herein, briefly summarized above, may be had by reference to the appended drawings.

It is to be noted, however, that the appended drawings illustrate typical embodiments and are therefore not to be considered limiting; other equally effective embodiments are contemplated.

DETAILED DESCRIPTION

Figure 1:
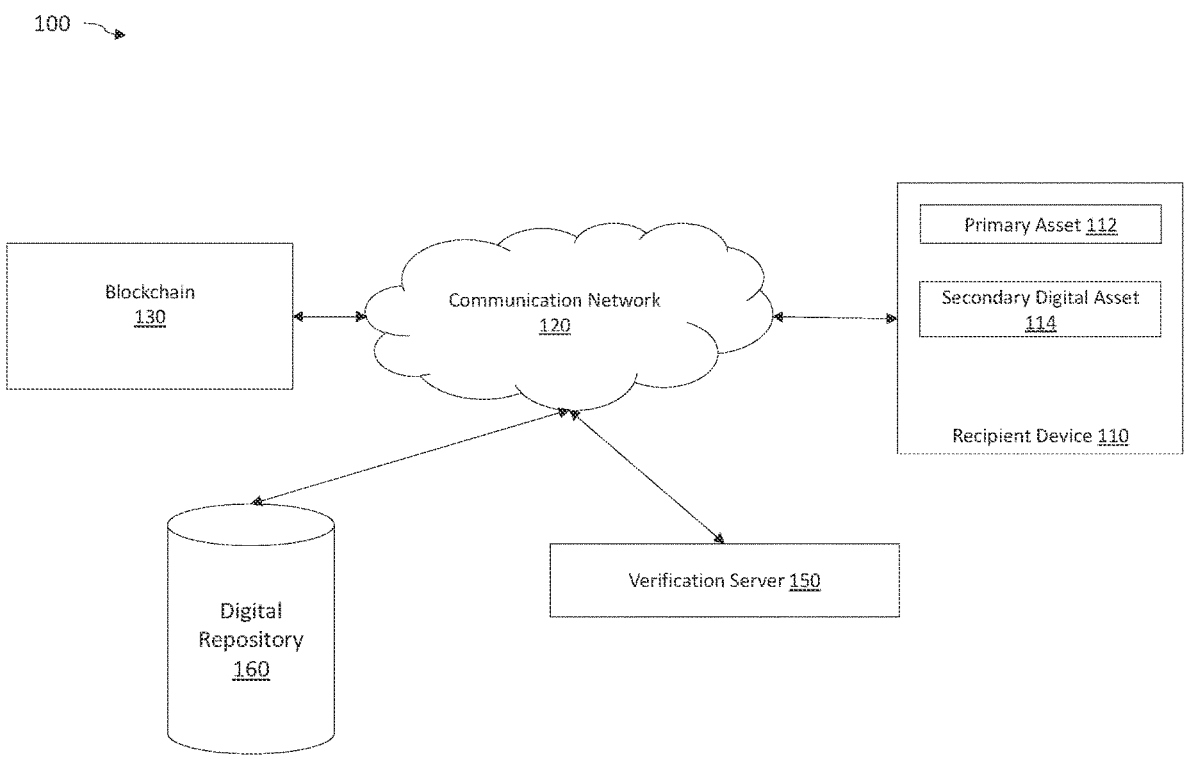
FIG. 1 illustrates a computing environment for generating secondary digital assets based on ownership of primary assets, according to one embodiment.

In an embodiment, traditional secondary benefits tied to ownership of an asset (e.g., dividends or physical stock certificates tied to ownership of stock) can be replaced with virtual secondary benefits. For example, a secondary digital asset (e.g., a non-fungible token (NFT) serving as an exclusive or limited edition digital collectible, a virtual currency, or any other suitable digital asset) could be used in place of, or in addition to, a traditional stock dividend tied to ownership of a stock. The secondary digital asset could be generated and awarded to shareholders (e.g., consumer shareholders) on an established schedule (e.g., annually, semi-annually, quarterly, monthly, etc.).

For example, as discussed below with regard to FIG. 3, an NFT could be generated as a secondary digital asset tied to ownership of a primary asset (e.g., shares of stock). The authenticity (e.g., proof of ownership) of each secondary digital asset could be verified based on entries in a decentralized distributed blockchain ledger. This is discussed further in U.S. Patent Pub. No. 2019/0266650, entitled "Configuration for Authenticating a Virtual Item," which is herein incorporated by reference.

In an embodiment, the secondary digital asset could be an NFT in which a digital token is tied to a digital collectible (e.g., a digital image or video representing a digital character animation or image). The NFT could be generated using a suitable smart contract associated with a blockchain, and the record of ownership of the NFT could be recorded in the blockchain and tied to a recipient's digital wallet, establishing that the recipient is the unique owner of the NFT. The digital character animation or image could, itself, be copied, but the copies would not be authenticated. In an embodiment, the authentication of the secondary digital asset provides value to the recipient by allowing the recipient to establish unique ownership of the secondary digital asset and potentially transfer unique ownership of the secondary digital asset.

Alternatively, or in addition, the secondary digital asset could be virtual currency (e.g., based on blockchain technology). Further, proof of ownership of the secondary digital asset could be established using an existing blockchain (e.g., relating to an established virtual currency), a new blockchain (e.g., established by the issuing entity), or a combination thereof. For example, instead of (or in addition to) use of an NFT or semi-fungible token, an established cryptocurrency (e.g., a small amount of Bitcoin) could be issued to a recipient of a secondary digital asset. This cryptocurrency could be used as a certificate of authenticity to establish ownership of the secondary digital asset by the recipient, and could itself have an intrinsic value. Use of blockchain is merely one example, and any suitable authentication technology could be used.

In an embodiment, the secondary digital asset can change dynamically depending on properties of the primary asset or other outside properties (e.g., economic indicators, consumer sentiment indicators, or any other suitable properties). For example, if the primary asset is a share of stock, the secondary digital asset can be an NFT in which the associated digital asset (e.g., image, video, or audio) changes based on properties of the stock (e.g., stock price, volume, trends, or any other suitable properties), properties of the corporate entity issuing the stock (e.g., economic or consumer sentiment about the entity, or any other suitable properties), properties of the economy more generally, or any other suitable properties. In this example a suitable smart contract could be used to modify the secondary digital asset (e.g., modify metadata relating to an NFT) to reflect the desired changes. This is discussed further, below, with regard to FIGS. 5A-B.

In an embodiment, the value of a secondary digital asset can change over time. For example, an entity issuing a secondary digital asset to stock shareholders could select the value of the secondary digital asset (e.g., the value of an NFT or collection of NFTs, or a quantity of cryptocurrency) based on performance of the stock. More valuable stock could result in issuance of more valuable secondary digital assets. As another example, the value of an issued secondary digital asset can be changed over time. For example, dynamic changes to the secondary digital asset (e.g., as discussed above) could change the value of the secondary digital asset based on properties of the primary asset, or any other suitable properties. And as another example, the market value of a secondary digital asset can change over time (e.g., based on demand in the marketplace for the asset).

One or more embodiments disclosed herein have numerous technical advantages and provide a practical application of improvement to a technology field, among other advantages. For example, a suitable blockchain can be used to verify ownership of the secondary digital asset and guarantee that the secondary digital asset is non-fungible, or semi-fungible. Use of a blockchain provides for secure, decentralized, verification of ownership and reduces the computational burden on the issuing entity and memory storage requirements for the issuing entity.

For example, a secondary digital asset could be issued directly by an entity that has issued a primary asset (e.g., shares of stock) and the authenticity could be verified by the issuing entity. But this is very computationally expensive. The issuing entity must maintain sufficient compute capabilities (e.g., using cloud compute nodes) to verify the authenticity of secondary digital items. As more and more secondary digital items are issued (e.g., over time) this becomes hugely burdensome and impractical. Use of a blockchain instead distributes the computational burden across the blockchain network, and significantly reduces the computational burden on the issuer. Further, later transfer of the secondary digital asset (e.g., a sale of the secondary digital asset from the original recipient to a purchaser) is verified and governed by the blockchain, rather than the original issuer. This again significantly reduces the computational burden to the issuer. Use of blockchain also significantly reduces the storage needs of the issuer, by distributing storage of token data across the blockchain rather than requiring the issuer to maintain the token data in its storage (e.g., in cloud storage controlled by the issuer). Thus, one or more embodiments described herein provide for the practical application of an improvement to a technical field by, among other advantages, using a blockchain to significantly reduce a computational and memory storage burden on an entity providing secondary assets, as compared to existing solutions.

The discussion herein uses NFTs as one example of a secondary digital asset, but this is merely an example. A secondary digital asset could instead be a semi-fungible token, or any other suitable digital asset. For example, an issuer could mint a limited number of semi-fungible tokens corresponding to outstanding shares of stock for a given fiscal quarter (e.g., one token per share, one token per 10 shares, one token per 1000 shares, or any other suitable correspondence). These semi-fungible tokens would be fungible among that issuance (e.g., all tokens minted for that quarter would be fungible), but would differ from prior and future issuances (e.g., tokens issued for prior and future fiscal quarters would not be fungible with tokens issued for the present quarter).

FIG. 1 illustrates a computing environment 100 for generating secondary digital assets based on ownership of primary assets, according to one embodiment. In an embodiment, a recipient controls a recipient device 110 and owns an interest in a primary asset 112, and based on that ownership interest receives a secondary digital asset 114. For example, as discussed above, the primary asset 112 can be one or more shares of stock relating to an entity. The secondary digital asset 114 can be a secondary digital asset relating to the entity (e.g., an NFT serving as a digital collectible, or a virtual currency relating to the entity), and can be distributed to the recipient based on the recipient's ownership interest in the primary asset. This is discussed further, below, with regard to FIG. 3.

For example, the secondary digital asset 114 can be an NFT corresponding to a digital collectible. A verification server 150 can verify that the recipient owns the primary asset 112, and can mint the secondary digital asset 114 using a smart contract associated with a blockchain 130. The NFT data (e.g., metadata) can also be recorded in the blockchain 130. Further, the digital asset associated with the secondary digital asset 114 (e.g., an image, video, or audio corresponding to the digital collectible) can be recorded in a digital repository 160 and identified based on a uniform resource identifier (URI) recorded in the blockchain 130. This is discussed further, below, with regard to FIGS. 4A-4B. In an embodiment, the blockchain 130 can be any suitable blockchain, including the Ethereum® blockchain, the Solana® blockchain, or any other suitable blockchain. The digital repository 160 can be any suitable digital repository, including a repository maintained by the entity generating the secondary digital asset 114, an InterPlanetary File System (IPFS®) repository, an Arweave® repository, or any other suitable repository.

In one embodiment, the secondary digital asset 114 remains static after it is issued (e.g., after minting or after transfer to the recipient having ownership interest in the primary asset 112) and does not change. Alternatively, the secondary digital asset 114 changes dynamically after it is created (e.g., after minting or after transfer to the recipient having ownership interest in the primary asset 112). For example, a digital image, video, or audio associated with the secondary digital asset 114 can change based on characteristics of the primary asset 112 (e.g., based on performance of a stock) or properties of the entity (e.g., a corporate entity, an artist, etc.) issuing the primary asset 112. This is discussed further, below, with regard to FIGS. 5A-B.

In an embodiment the verification server 150 facilitates creation, verification, and distribution of secondary digital assets. As discussed above the verification server 150 can, for example, verify that the recipient owns the primary asset 112, can mint the secondary digital asset 114 (e.g., mint an NFT with token data recorded in the blockchain 130 and associated digital assets stored in the digital repository 160), and after minting, can verify that the recipient owns the secondary digital asset 114.

In an embodiment, evidence that the recipient owns the primary asset 112, the secondary digital asset 114, or both, can be stored at a local storage location in the recipient device 110, in a remote storage location (e.g., a cloud storage location), or at any other suitable location (e.g., a stock management or recording service). The recipient device 110 can be any suitable digital device, including a computer, a smartphone, a tablet, a wearable device, a hardware wallet, or any other suitable electronic device. For example, a third party service could be used to verify that the recipient owns the primary asset 112. The verification server 150 could contact the third party service (e.g., using a suitable application programming interface (API)) to verify that the recipient owns the primary asset 112. This is merely an example, and the verification server 150 can use any suitable technique to verify that the recipient owns the primary asset 112.

In an embodiment, the verification server 150 can verify that the secondary digital asset 114 is owned by the recipient using a digital wallet associated with the recipient. For example, as discussed above, the secondary digital asset 114 could be an NFT generated using a smart contract and recorded in the blockchain 130. The verification server 150 can verify that the secondary digital asset 114 is held by a suitable wallet (e.g., a cryptocurrency software or hardware wallet) associated with the recipient. In an embodiment, the wallet stores public and private keys for cryptocurrency transactions for the recipient, allowing the recipient to establish ownership of the secondary digital asset 114. For example, the verification server 150 can query the associated smart contract to determine that the NFT is held by the recipient's wallet. In this example the recipient device 110 can be a hardware wallet, a computing device associated with a suitable software wallet, or any other suitable computing device. In an embodiment, the smart contract can be any suitable smart contract, including a smart contract compliant with Ethereum Requests for Comments (ERC) 721 (ERC-721), ERC-1155, or any other suitable standard.

In an embodiment, any, or all, of the elements of the computing environment 100 are connected using a communication network 120. For example, the elements of the computing environment 100 can interact using any combination of local area networks (LAN), wide area networks (WANs), the Internet, or any other suitable communication network 120. Further, the elements of the computing environment 100 can be connected to the communication network 120 using any suitable network connection, including a wired connection (e.g., an Ethernet or fiber optic connection), a wireless connection (e.g., a WiFi connection), a cellular connection, or any other suitable network connection.

Figure 2:
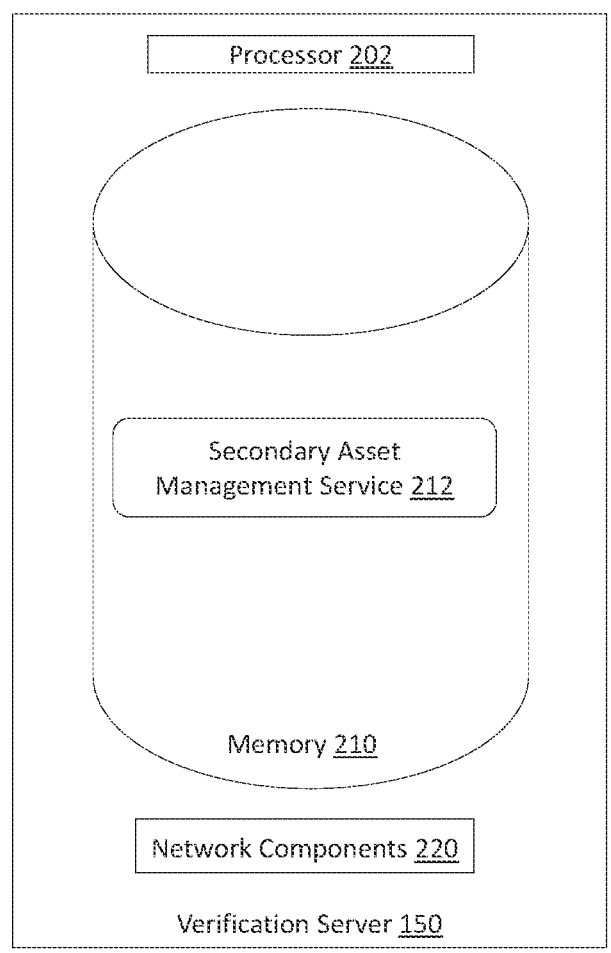
FIG. 2 illustrates a verification server for generating secondary digital assets based on ownership of primary assets, according to one embodiment.

FIG. 2 illustrates a verification server for generating secondary digital assets based on ownership of primary assets, according to one embodiment. The verification server 150 includes a processor 202, a memory 210, and network components 220. The memory 210 may take the form of any non-transitory computer-readable medium. The processor 202 generally retrieves and executes programming instructions stored in the memory 210. The processor 202 is representative of a single central processing unit (CPU), multiple CPUs, a single CPU having multiple processing cores, graphics processing units (GPUs) having multiple execution paths, and the like.

The network components 220 include the components necessary for the verification server 150 to interface with a suitable communication network (e.g., the communication network 120 interconnecting various components of the computing environment 100 illustrated in FIG. 1, or interconnecting the computing environment 100 with other computing systems). For example, the network components 220 can include wired, WiFi, or cellular network interface components and associated software. Although the memory 210 is shown as a single entity, the memory 210 may include one or more memory devices having blocks of memory associated with physical addresses, such as random access memory (RAM), read only memory (ROM), flash memory, or other types of volatile and/or non-volatile memory.

The memory 210 generally includes program code for performing various functions related to use of the verification server 150. The program code is generally described as various functional "applications" or "modules" within the memory 210, although alternate implementations may have different functions and/or combinations of functions. Within the memory 210, the secondary asset management service 212 facilitates creation, verification, and distribution of secondary digital assets. This is discussed further below with regard to FIG. 3.

While the verification server 150 is illustrated as a single entity, in an embodiment, the various components can be implemented using any suitable combination of physical compute systems, cloud compute nodes and storage locations, or any other suitable implementation. For example, the verification server 150 could be implemented using a server or cluster of servers. For example, one or more of the components of the verification server 150 can be implemented using a public cloud, a private cloud, a hybrid cloud, or any other suitable implementation. Further, the verification server 150 may include one or more computing platforms, such as computer servers for example, which may be co-located, or may form an interactively linked but distributed system, such as a cloud-based system.

Further, although FIG. 2 depicts the secondary asset management service 212 as being located in the memory 210, that representation is also merely provided as an illustration for clarity. More generally, the verification server 150 may include one or more computing platforms, such as computer servers for example, which may be co-located, or may form an interactively linked but distributed system, such as a cloud-based system. As a result, processor 202 and memory 210, may correspond to distributed processor and memory resources within the computing environment 100. Thus, it is to be understood that the secondary asset management service 212 may be stored remotely within the distributed memory resources of the computing environment 100.

Figure 3:
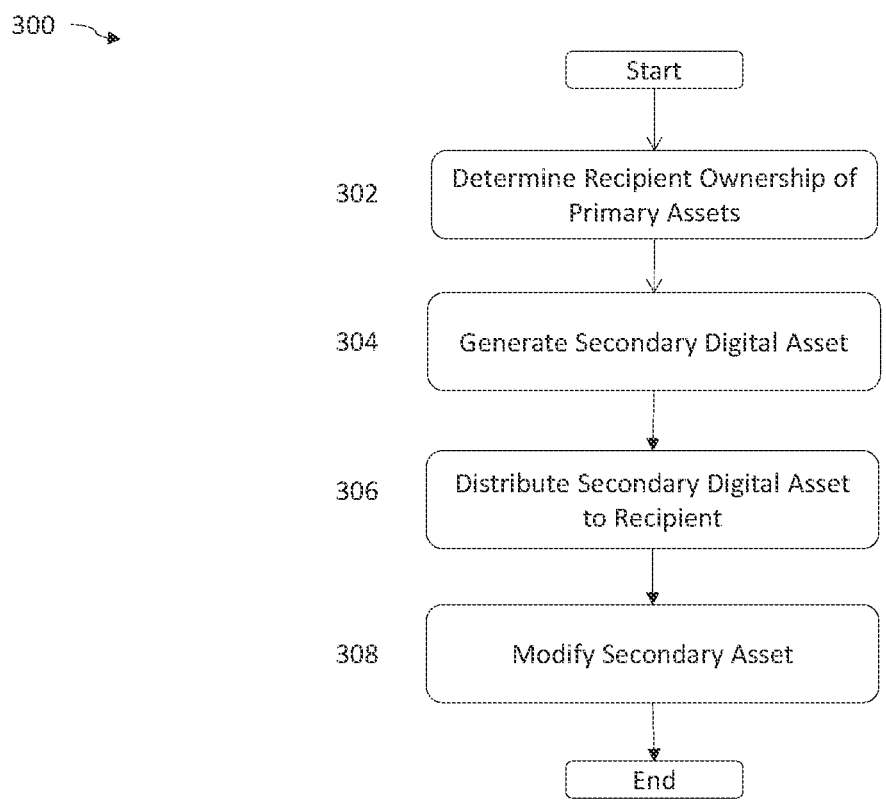
FIG. 3 is a flowchart illustrating generating secondary digital assets based on ownership of primary assets, according to one embodiment.

FIG. 3 is a flowchart 300 illustrating generating secondary digital assets based on ownership of primary assets, according to one embodiment. At block 302, a secondary asset management service (e.g., the secondary asset management service 212 illustrated in FIG. 2) determines recipient ownership of one or more primary assets. For example, as discussed above in relation to FIG. 1, the primary assets can be one or more shares of company stock. The secondary asset management service can query a suitable API (e.g., maintained by a third party or by the company issuing the stock) to determine how many shares of the company stock the recipient owns. This is merely an example, and the primary asset can be any suitable asset and the secondary asset management service can determine recipient ownership of the primary asset using any suitable technique.

At block 304, the secondary asset management service generates a secondary digital asset (e.g., corresponding to the primary asset). For example, the secondary asset management service can mint an NFT relating to an entity with which the primary asset is associated. This is discussed further, below, with regard to FIGS. 4A-4B. This NFT could act as a digital collectible by referencing a digital image, video, audio recording, or other suitable digital asset associated with the primary asset entity. Further, as discussed below in relation to FIGS. 4A-4B, the characteristics of the NFT can vary based on the recipient ownership of the primary asset (e.g., based on a number of shares owned by the recipient, a duration of ownership, a type of shares or ownership, or any other suitable criteria)

At block 306, the secondary asset management service distributes the secondary digital asset to the recipient. In an embodiment, the secondary asset management service can distribute the digital collectible or virtual currency to the recipient, based on determining that the recipient owns the primary asset. For example, the secondary asset management service can distribute an NFT minted at block 304 to a digital wallet associated with the recipient, and can record the ownership in a blockchain ledger (e.g., the blockchain 130 illustrated in FIG. 1). Further transfers of the secondary digital asset can then be recorded in the blockchain, including transfers from the recipient to a third party (e.g., later purchaser that did not receive the secondary digital asset directly from the secondary asset management service).

In an embodiment, a same entity determines recipient ownership of the one or more primary assets (e.g., as discussed above in relation to block 302), generates the secondary digital asset (e.g., as discussed above in relation to block 304), and distributes the secondary digital asset to the recipient (e.g., as discussed above in relation to block 306). But this is merely an example. Alternatively, or in addition, different entities can perform any, or all, of these tasks. For example, a company issuing stock could determine recipient ownership of shares of stock, and could distribute to the recipient a secondary asset (e.g., an NFT, cryptocurrency, or any other suitable secondary asset) that was previously generated by another entity. Any, or all, of these tasks can be performed by different entities. Further, as discussed below, the illustrated order of blocks 302, 304, and 306 in FIG. 3 is merely an example. For example, the secondary digital asset could be generated (e.g., an NFT could be minted) before determining recipient ownership of the one or more primary assets.

In an embodiment, recipients of the secondary digital asset could keep ownership of the secondary digital asset, gift the secondary digital asset to another party, or sell the secondary digital asset based on a market price (e.g., using an NFT marketplace). As discussed above, in an embodiment blockchain technology can be used to verify the ownership of the secondary digital asset (e.g., an NFT). This could allow a recipient of the secondary digital asset to freely dispose of the secondary digital asset, with any owner of the secondary digital asset (e.g., the original recipient or a later recipient) being confident of the exclusivity.

For example, a shareholder could receive an NFT serving as a digital collectible reflecting a character, object, image, video, or audio related to the issuing company. The shareholder could sell this NFT to an interested buyer, or gift the NFT to a family member or friend. As another example, a shareholder could receive a virtual currency. The shareholder could hold the virtual currency, use the virtual currency to purchase goods or services (e.g., from a retail store related to the issuing company), exchange the virtual currency for a different virtual currency (e.g., Bitcoin or another virtual currency), or exchange virtual currency for a fiat currency.

In an embodiment, a recipient of a secondary digital asset could receive tangible and intangible benefits from the secondary digital asset. For example, as discussed above, the secondary digital asset could relate to a digital image, video, or audio. The recipient could present this digital image, video, or audio to others in a digital or physical environment. For example, the recipient could use a digital character animation or image as an avatar or personal representation in a digital environment (e.g., as an avatar in an electronic video game, streaming service or social media platform) that can be experienced by any number of users synchronously and persistently, while providing continuity of data such as personal identity, user history, entitlements, possessions, payments, and the like. The digital environment may be, for example, a social media platform, a virtual reality (VR) environment, an augmented reality (AR) environment, or a mixed reality (MR) environment.

As another example, the recipient could also be provided with, or provided with a way to purchase, a physical display medium (e.g., a physical frame, an audio speaker, a keychain, a case for a mobile device, a toy or other object, or any other suitable physical medium). The physical medium could present the secondary digital asset (e.g., on a suitable display screen, using an audio speaker, using a holographic projection, or in any other suitable manner). Further, a recipient of multiple secondary digital assets (e.g., a shareholder for multiple distribution periods) could present all of their received secondary digital assets. For example, the recipient could maintain a library of available secondary digital assets, and could select how many, and which, secondary digital assets to present (e.g., on a suitable display screen or speaker, or in a suitable digital environment).

In an embodiment, ownership of the secondary digital asset could be verified prior to allowing display of the secondary digital asset. For example, as discussed above, ownership of a secondary digital asset could be verified using blockchain technology (e.g., using entries in a distributed blockchain ledger). In an embodiment, a virtual or physical display medium can verify that the owner of the virtual or physical display medium is also the owner of the secondary digital asset, prior to allowing display of the secondary digital asset. This could be done by verifying the blockchain records (e.g., using a suitable smart contract), or using any suitable technique. As an example, a recipient of a secondary digital asset could transfer or sell the secondary digital asset. After transfer, the transferee would be authorized to display the secondary digital asset (e.g., using a physical or virtual display medium with verification capabilities), but the transferor would no longer be authorized. This is merely one example. Alternatively, or in addition, secondary digital assets could be viewed and displayed by anyone, but authentic ownership could be verified using a suitable authentication technique (e.g., using blockchain technology).

As another example the recipient could stake the secondary digital asset to receive benefits. For example, the secondary digital asset could be an NFT. A suitable smart contract could be used to allow recipients of NFTs to stake tokens and receive benefits while the token is staked. For example, the smart contract could provide recipients with additional digital assets (e.g., additional NFTs, virtual currency, digital items, or any other suitable digital assets) or physical assets (e.g., physical items, event tickets, movie passes, or any other suitable physical assets) so long as the recipient's token is staked. In an embodiment, blockchain related assets (e.g., NFTs or virtual currency) could be provided to a digital wallet associated with the recipient.

As discussed above, in an embodiment the secondary digital asset includes a virtual currency. In an embodiment, this virtual currency is an established virtual currency. Alternatively, or in addition, the virtual currency is created by the entity issuing the secondary digital asset (e.g., the entity to which the primary stock is tied). For example, a publicly held company could create its own virtual currency (e.g., using blockchain technology). This virtual currency could be used to establish ownership of a secondary digital asset (e.g., ownership of a digital collectible). The virtual currency could also, itself, have a benefit for the owner. For example, the issuing company could allow the virtual currency to be used to purchase generally available company products (e.g., merchandise, tickets to events or locations, movie or television content, etc.).

As another example, the issuing company could allow the virtual currency to be exchanged for exclusive, or unusual, items. For example, the secondary digital asset could be a virtual currency that could be exchanged for a digital collectible of the owner's choice. In an embodiment, the digital collectible could only be acquired, from the issuing entity, using the virtual currency. In this embodiment the digital collectible may still be transferred by the original recipient to another party (e.g., sold on a secondary market for fiat currency or other virtual currency).

Further, an owner could receive an additional secondary digital asset based on ownership of a virtual currency. For example, virtual currency could be issued by a publicly traded company to shareholders on a set schedule. Ownership of a particular quantity of the virtual currency could entitle the owner to another secondary digital asset (e.g., an NFT serving as a digital collectible). Rather than exchanging virtual currency for a digital collectible, holders of a given quantity of virtual currency could be automatically entitled to receive a digital collectible, or automatically entitled to received changes or updates to a previously issued digital collectible. As discussed above, this could be applied to an existing virtual currency or a new virtual currency from the issuing entity.

At block 308 the secondary asset management service modifies the secondary digital asset. In an embodiment, the secondary digital asset can dynamically change over time. For example, the secondary digital asset can be an NFT associated with metadata and a digital asset (e.g., a digital image, video, audio, or any other suitable digital asset). In an embodiment, the metadata, digital asset, or both can change over time. For example, an NFT serving as a digital collectible could be issued to shareholders once in a given time period (e.g., once per year) and could periodically change over time. These changes could occur at defined intervals (e.g., monthly, quarterly, etc.), based on events or changes relating to the stock (e.g., changes in value of the stock, changes relating to the entity issuing the stock, changes relating to the economic environment more broadly, or any other suitable changes). These changes to the NFT could relate to the look and feel of the collectible.

For example, a digital asset associated with the NFT could change such that a character animation or image acquires new skins that change the attire of the character, new backgrounds, additional characters in the scene, etc. This could be done by changing the URI associated with the NFT to point to a different digital asset (e.g., a different image reflecting the changes), by changing the contents of the digital asset at a given URI to reflect the change (e.g., modifying an image identified by the URI associated with the NFT), or using any other suitable technique. Dynamic changes to the secondary digital asset are discussed further, below, with regard to FIGS. 5A-5B.

As discussed above, in one embodiment the secondary digital asset changes dynamically over time. Alternatively, or in addition, additional secondary digital assets could be provided periodically (e.g., related digital assets). For example, an NFT relating to a digital character animation or image could be issued to shareholders once per year. Quarterly, shareholders could additionally receive an NFT associated with a modified version of the digital character animation or image (e.g., with a modified skin, background, additional accessories/clothing, additional characters, etc.). In an embodiment, only shareholders who own the originally issued secondary digital asset (e.g., the NFT digital collectible issued for that year) could receive the modified version of the secondary digital asset. Alternatively, shareholders can receive modified secondary digital assets so long as they own the underlying shares (e.g., regardless of whether the shareholder also owns the originally provided secondary digital asset). Further, transferees of the secondary digital asset (e.g., who did not receive the secondary digital asset initially) could be entitled to receive the modified versions.

Further, in an embodiment, multiple secondary digital assets could be combined to form a new secondary digital asset. For example, an NFT serving as a digital collectible (e.g., a character image or animation) could be issued quarterly to shareholders of a company's stock. Each digital collectible could be kept, or transferred, individually. A shareholder who receives all digital collectibles for a given year, however, could combine all or a subset of the digital collectibles to form a new digital collectible (e.g., an animation or image reflecting all four individual digital collectibles). In an embodiment, the shareholder receives the new NFT as a digital collectible in addition to the individual NFT digital collectibles (e.g., in addition to the four quarterly NFT digital collectibles). Alternatively, the shareholder receives the new NFT digital collectible in place of the individual NFT digital collectibles (e.g., the shareholder is required to surrender the individual NFT digital collectible to receive the new NFT digital collectible). In an embodiment, a suitable smart contract could be used to provide the new NFT digital collectible, and to govern surrendering of the older NFT digital collectible (as appropriate).

In an embodiment, the recipient of a dynamic secondary digital asset may only receive dynamic updates while they own the primary asset to which the secondary digital asset is associated. For example, a secondary digital asset could be provided yearly, and could receive quarterly changes. The recipient of the secondary digital asset could only receive the quarterly updates if the recipient still owns both the secondary digital asset and the underlying primary asset(s). This is merely on example. Alternatively, the dynamic secondary digital asset could be updated for the current owner regardless of ownership of the primary asset (e.g., for a specified period of time).

As discussed above in relation to block 308, in one embodiment the secondary digital asset can change over time. But block 308 is optional. In another embodiment, the secondary digital asset remains static after it is generated. For example, the secondary digital asset can be an NFT that is minted and distributed to the recipient, and then remains static.

Figure 4A:
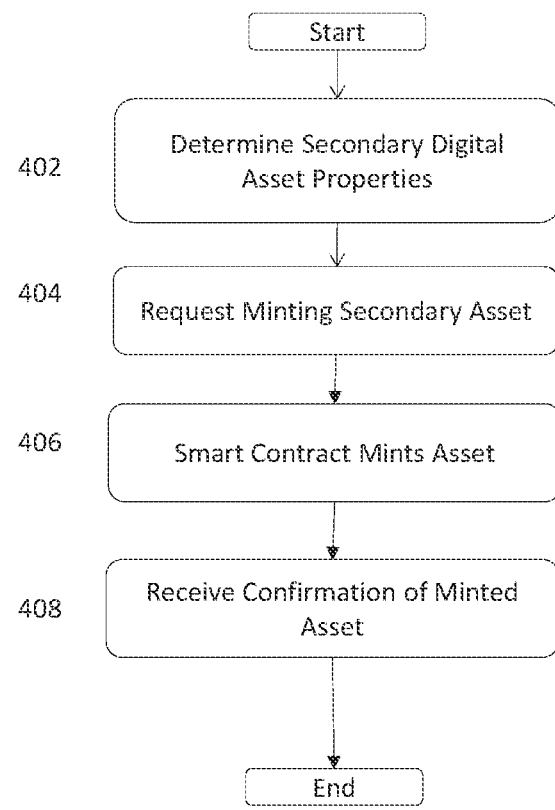
FIG. 4A is a flowchart illustrating generating secondary digital assets based on ownership of primary assets, according to one embodiment.

FIG. 4A is a flowchart illustrating generating secondary digital assets based on ownership of primary assets, according to one embodiment. In an embodiment, FIG. 4A corresponds to block 304 illustrated in FIG. 3 and illustrates, as one example, generating an NFT or a semi-fungible token. As discussed above, an NFT or semi-fungible token is merely one example of a suitable secondary asset.

At block 402, a secondary asset management service (e.g., the secondary asset management service 212 illustrated in FIG. 2) determines secondary digital asset properties. For example, the primary asset can be shares of stock for a company. Each shareholder could receive one or more of the secondary digital assets depending on stock ownership. A shareholder could receive a secondary digital asset (e.g., an NFT representing a digital collectible) for each share owned (e.g., an owner of 100 shares would receive 100 digital assets). Alternatively, or in addition, a shareholder could receive fewer total secondary digital assets than the number of shares owned, but the secondary digital asset could vary based on the number of shares owned. In this example a number of NFTs could be provided to recipients in proportion to the quantity of shares owned. For example, one NFT could be provided for every 10 shares owned. Stock ownership is merely one example, and the secondary digital asset could be provided based on ownership of any suitable primary asset (e.g., a physical item, a digital item, an ownership interest in real or intellectual property, or any other suitable asset).

As discussed above, in an embodiment, the secondary digital asset could be an NFT serving as a digital collectible. For example, a publicly traded companying issuing shares could provide shareholders with an NFT associated with a digital asset (e.g., an image, video, audio, or any other suitable digital asset) that serves as digital collectible relating to that company. A media company could, for example, provide a collectible digital character animation, or image (e.g., an image of a frame of content property, an image of a storyboard, an image of an initial sketch, etc.), as an NFT to its shareholders. The digital character animation or image could depict a character relating to the company, in a setting desirable to collectors. A digital character animation or image is merely one example, and any suitable digital asset could be used.

In an embodiment, the digital asset (e.g., digital image, video, audio, or other suitable digital asset) can be generated in any suitable fashion. For example, the secondary digital asset could be an NFT associated with an animation or image from an existing content property (e.g., an image or scene from an existing movie or television show). As another example, the secondary digital asset could be an NFT associated with a new item (e.g., generated based on existing characters or content properties). For example, the digital asset could be generated using a machine learning (ML) model (e.g., a supervised ML model). The ML model could be trained using data reflecting consumer preferences (e.g., for characters, subject matter, form of collectible, etc.), available subjects for the collectible, marketing plans or materials, goals for retention of the primary asset, and any other suitable data, and could generate a digital collectible. Alternatively, the digital collectible could be generated by an artist or animator.

In an embodiment, the secondary digital asset is generated to be the same for all owners of the primary asset. Alternatively, the secondary digital asset is personalized, or individualized, based on the recipient (e.g., based on various characteristics of the recipient). For example, different recipients or categories of recipients could receive different digital collectibles (e.g., based on expressed preferences, available purchase or viewing history relating to the issuing company, etc.). As another example, the secondary digital asset may be provided to a recipient based on the recipient's ownership of other digital assets, or other items (e.g., an owner of assets relating to a particular movie or television show could receive further digital assets relating to the same movie or television show). In this embodiment, an ML model could be further trained to generate the various digital assets, based on information about recipients (e.g., information provided by recipients or expressly authorized by recipients), or to dynamically modify the digital assets.

Figure 4B:
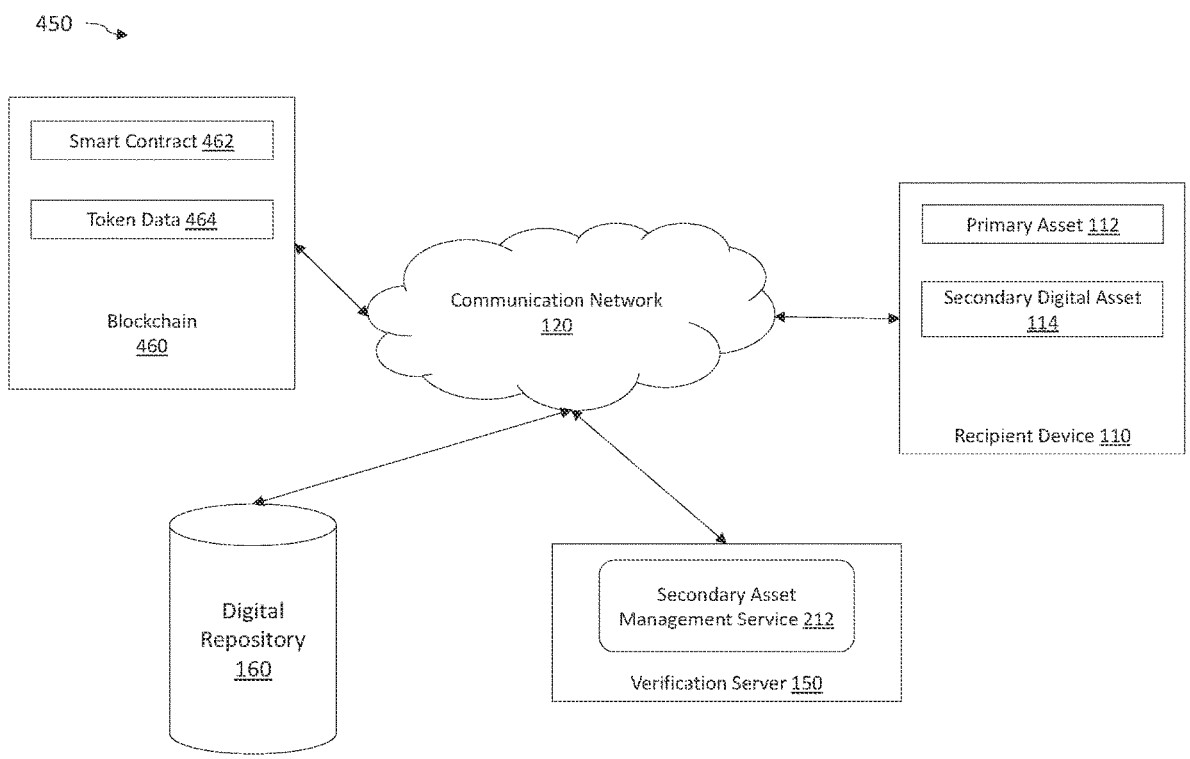
FIG. 4B is a block diagram illustrating generating secondary digital assets based on ownership of primary assets, according to one embodiment.

At block 404, the secondary asset management service requests minting the secondary digital asset. This can be described with reference to FIG. 4B. For example, as illustrated in FIG. 4B, the secondary digital asset 114 can be an NFT. FIG. 4B is a block diagram 450 illustrating generating secondary digital assets based on ownership of primary assets, according to one embodiment. The secondary asset management service 212 can request that a smart contract 462, associated with the blockchain 460, mint the secondary digital asset 114. For example, the secondary asset management service 212 can provide the secondary digital asset properties identified at block 402 as parameters to the smart contract 462, and can request that the smart contract 462 mint the secondary digital asset based on those parameters.

At block 406, the smart contract 462 mints the asset. In an embodiment, as part of the minting the smart contract 462 can record token data 464 for the secondary digital asset 114. This token data 464 can include a variety of metadata, including metadata reflecting characteristics of the primary asset 112. For example, the primary asset 112 can be shares of company stock, and token data 464 can include a record of characteristics of the company stock (e.g., stock price, stock performance trends, outstanding shares, market capitalization, or any other characteristics). The token data 464 can further include a URI corresponding to a digital asset in the digital repository 160. For example, the token data 464 can include a URI corresponding to a digital image, video, or audio that serves as a digital collectible for the recipient.

At block 408, the secondary asset management service receives confirmation of the minted asset. For example, the smart contract 462 can provide confirmation that the asset is minted and associated with the recipient's digital wallet.

Figure 5A:
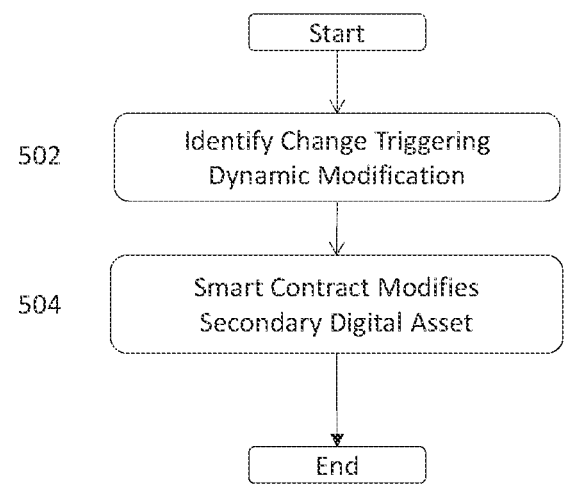
FIG. 5A is a flowchart illustrating dynamically modifying secondary digital assets based on changes to primary assets, according to one embodiment.

FIG. 5A is a flowchart illustrating dynamically modifying secondary digital assets based on changes to primary assets, according to one embodiment. In an embodiment, FIG. 5A corresponds with block 308 illustrated in FIG. 3. As discussed above, in an embodiment a secondary digital asset can change dynamically based on the properties of the primary asset to which the secondary digital asset is tied.

At block 502 a secondary asset management service (e.g., the secondary asset management service 212 illustrated in FIG. 2) identifies a change triggering dynamic modification. For example, an NFT serving as a digital collectible could be issued as a benefit to shareholders. The characteristics of the digital collectible could change based on performance of the underlying stock (the primary asset). As one example, if the stock price rises, the characteristics of the digital collectible could change to reflect that rise (e.g., a digital image or video could be changed so that the background is sunny or includes a rare color). As another example, if the stock price falls, the characteristics of the digital collectible could change to reflect that fall (e.g., the digital image or video could be changed so that the background is rainy or implemented using a more common color). In an embodiment, the characteristics of the secondary digital asset could change periodically (e.g., based on performance of the primary asset at the beginning or end of a quarter, or at another defined point). Further, the characteristics of the secondary digital asset could change if the performance of the primary asset changes sufficiently to meet a threshold value (e.g., a 10% increase or a 10% drop).

Further, the secondary digital asset could receive more, or fewer, dynamic changes during its scheduled change period (e.g., on a quarterly schedule) depending on performance of the underlying stock during that period. For example, an NFT could be scheduled to have its associated digital asset (e.g., digital image, video, audio, or any other suitable digital asset) dynamically change once per quarter. If the stock price is approximately the same at the end of the quarter as at the beginning of the quarter (e.g., within a range), the digital asset could receive one set of changes. If the stock price rises, the digital asset could receive a different (e.g., more desirable) set of changes. If the stock price falls, the digital asset could receive no changes (or less desirable changes). For example, the digital asset could include more, or less, foreboding, dangerous-appearing, or desirable characters or colors based on performance of the underlying asset. These are merely examples, and the secondary digital asset could change dynamically in any suitable fashion based on the properties of the primary asset.

Figure 5B:
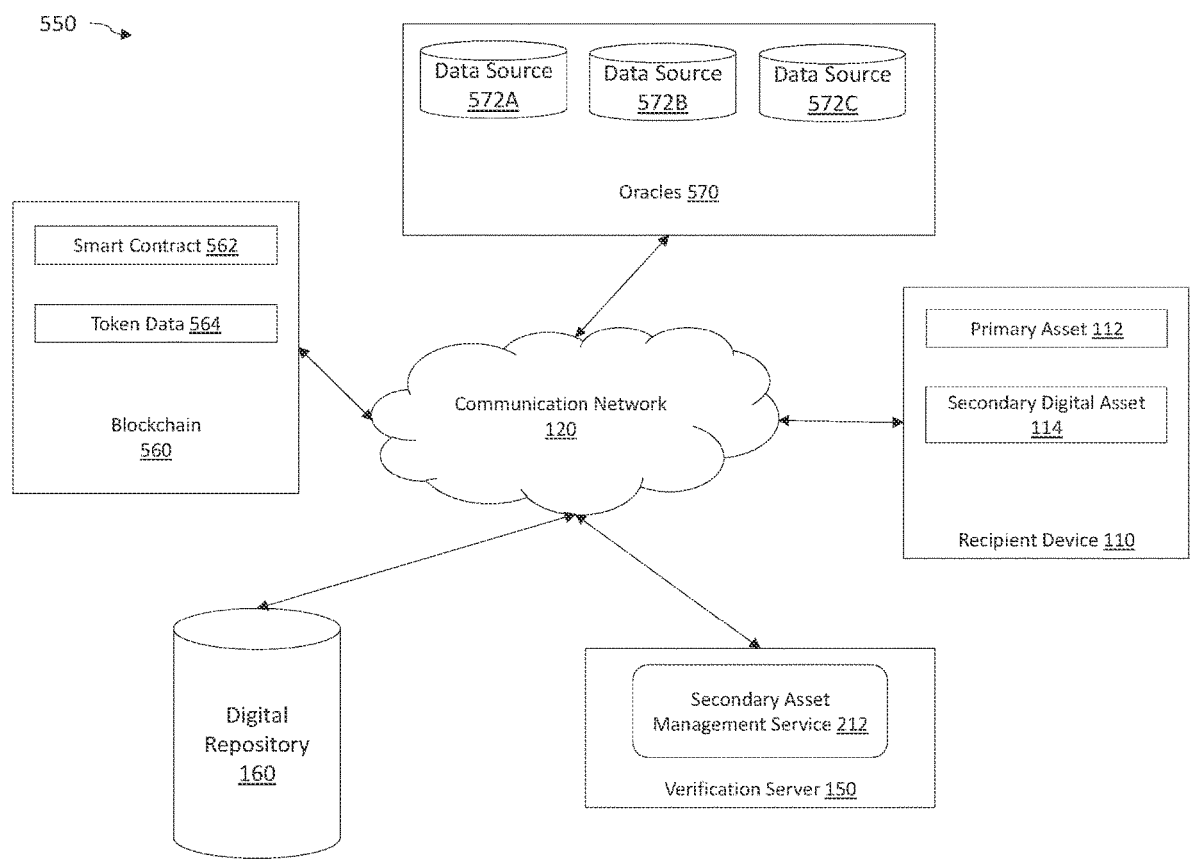
FIG. 5B is a block diagram illustrating dynamically modifying secondary digital assets based on changes to primary assets, according to one embodiment.

FIG. 5B can be used for further explanation. FIG. 5B is a block diagram 550 illustrating dynamically modifying secondary digital assets based on changes to primary assets, according to one embodiment. In an embodiment, a smart contract 562, associated with a blockchain 560, can use one or more oracles 570 to retrieve information about changes relating to the primary asset 112.

In an embodiment, the oracles 570 provide a connection between the blockchain 560 and external data sources. For example, the oracles 570 can include one or more data sources 572A-572C, and can act as sources for data relating to the primary asset 112. Where the primary asset 112 is shares in a company stock, for example, the oracles 570 can provide information about the performance of the stock, characteristics of the stock, or any other suitable information. The smart contract 562 can use the oracles 570 to retrieve the information about the primary asset. This is merely an example, and the secondary asset management service 212 can instead retrieve data relating to the primary asset, the smart contract 562 can retrieve data relating to the primary asset from another source (e.g., different from the oracles 570), or any other suitable technique can be used.

Referring again to FIG. 5A, at block 504 the smart contract modifies the secondary digital asset. In an embodiment, looking again to FIG. 5B, the smart contract 562 can use information retrieved from the one or more oracles 570 to modify the token data 564 stored in the blockchain 560. For example, the smart contract 562 can use information retrieved from the one or more oracles 570 to modify stored metadata relating to the primary asset 112 (e.g., describing stock performance or characteristics).

Further, the smart contract 562 can modify a URI associated with the token data 564 to identify a different digital asset stored in the digital repository 160. For example, assume the secondary digital asset is an NFT associated with a digital image or animation stored in the digital repository (this is merely one example). The token data 564 can include a URI used to identify the location of the digital image or animation in the digital repository. In an embodiment, the smart contract 562 can modify the secondary digital asset 114 by modifying the URI to instead identify a location of a different digital image or animation reflecting a desired change to the secondary digital asset.

Figure 6:
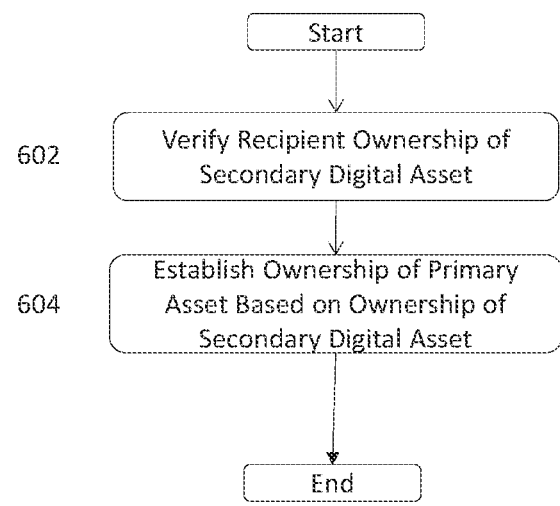
FIG. 6 is a flowchart illustrating establishing ownership of a primary asset based on verifying ownership of a secondary digital asset, according to one embodiment.

FIG. 6 is a flowchart 600 illustrating establishing ownership of a primary asset based on verifying ownership of a secondary digital asset, according to one embodiment. In an embodiment, a secondary digital asset could also be used to establish ownership of the primary asset. For example, the secondary digital asset could be an NFT serving as a digital collectible, or virtual currency, and ownership of the secondary digital asset could be established using blockchain technology. Ownership of the secondary digital asset could be tied to ownership of the primary asset, and ownership of a primary asset (e.g., a share of stock) could be tied to ownership of the secondary digital asset, such that transfer of either the primary asset or secondary digital asset would result in transfer of both.

That is, in an embodiment, the primary asset and secondary digital assets could be guaranteed to always be owned by the same entity. In this embodiment, establishing ownership of the secondary digital asset (e.g., the digital collectible or virtual currency) using a blockchain would also establish ownership of the primary asset (e.g., the share of stock), or establishing ownership of the primary asset using blockchain would also establish ownership of the secondary digital asset. Alternatively, or in addition, ownership of the primary asset and secondary digital assets (e.g., the stock and the digital collectible) could be de-coupled, as discussed above in relation to block 306 illustrated in FIG. 3, such that an owner may individually sell either the primary asset or the secondary digital asset without selling both. Further, in an embodiment, various aspects of the secondary digital asset could be owned, and transferred, separately. For example, the original recipient of a dynamic NFT serving as a digital collectible could sell, or retain, the rights to future changes to that collectible.

At block 602, a secondary asset management service (e.g., the secondary asset management service 212 illustrated in FIGS. 2 and 5B) verifies recipient ownership of a secondary digital asset. For example, looking to FIG. 5B, the secondary asset management service uses the smart contract 562 to verify that a recipient owns the secondary digital asset 114

(e.g., the smart contract 562 could verify that a digital wallet associated with the recipient device 110 holds the secondary digital asset 114).

At block 604, the secondary asset management service establishes ownership of a primary asset based on ownership of the secondary digital asset. For example, the primary asset 112 illustrated in FIG. 5B could be share of company stock. The secondary asset management service could interact with a suitable third party stock management system (e.g., using a suitable API) to establish that the recipient owns the primary asset 112, based on the recipient's ownership of the secondary digital asset 114 (e.g., verified at block 602).

In the current disclosure, reference is made to various embodiments. However, it should be understood that the present disclosure is not limited to specific described embodiments. Instead, any combination of the following features and elements, whether related to different embodiments or not, is contemplated to implement and practice the teachings provided herein. Additionally, when elements of the embodiments are described in the form of "at least one of A and B," it will be understood that embodiments including element A exclusively, including element B exclusively, and including element A and B are each contemplated. Furthermore, although some embodiments may achieve advantages over other possible solutions or over the prior art, whether or not a particular advantage is achieved by a given embodiment is not limiting of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, embodiments described herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments described herein may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations or block diagrams of methods, apparatuses (systems), and computer program products according to embodiments of the present disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations or block diagrams.

The flowchart illustrations and block diagrams in the Figures illustrate the architecture, functionality, and operation of possible implementations of systems, methods, and computer program products according to various embodiments of the present disclosure. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order or out of order, depending upon the functionality involved. It will also be noted that each block of the block diagrams or flowchart illustrations, and combinations of blocks in the block diagrams or flowchart illustrations, can be implemented by special purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:
1. A method comprising:
determining that a recipient owns a share of an entity;

generating an asset relating to the share of the entity, wherein the asset comprises a token and an associated digital asset, and wherein information relating to the asset is recorded in a blockchain;

distributing the asset to the recipient;

recording, in the blockchain, data relating to distributing the asset to the recipient; and modifying the asset based on a change in a value of the share, wherein when the change relating to the value of the share is a first change, the asset is modified such that the associated digital asset to have a first appearance, and when the change relating to the value of the share is a second change, the asset is modified such that the associated digital asset to have a second appearance different than the first appearance.

2. The method of claim 1, wherein the token comprises at least one of a non-fungible token (NFT) or a semi-fungible token, and wherein the associated digital asset comprises content relating to the share of the entity.

3. The method of claim 1, wherein the first change is the value of the share falling, and the second change is the value of the share rising.

4. The method of claim 1, wherein the share comprises a share of stock of the entity.

5. The method of claim 1, further comprising:

determining that the recipient maintains ownership of the share at a second time, later than a first time at which the asset is distributed to the recipient; and based on determining that the recipient maintains ownership of the share at the second time, performing at least one of: (i) modifying the associated digital asset, or (ii) distributing a third digital asset to the recipient.

6. The method of claim 5, wherein the associated digital asset comprises a first one or more images depicting content relating to the share of the entity, and wherein the third digital asset comprises a second one or more images relating to the content depicted in the first one or more images.

7. The method of claim 1, wherein the asset is generated using a trained machine learning (ML) model.

8. The method of claim 1, wherein modifying the asset uses a trained ML model.

9. The method of claim 1, wherein the asset comprises one or more images configured to be displayed on a physical display, and wherein the physical display is configured to verify ownership of the asset.

10. A non-transitory computer-readable medium containing computer program code that, when executed by operation of one or more computer processors, performs a method comprising:

determining that a recipient owns a share of an entity;

generating an asset relating to the share of the entity, wherein the asset comprises a token and an associated digital asset, and wherein information relating to the asset is recorded in a blockchain;

distributing the asset to the recipient;

recording, in the blockchain, data relating to distributing the asset to the recipient; and modifying the asset based on a change in a value of the share, wherein when the change relating to the value of the share is a first change, the asset is modified such that the associated digital asset to have a first appearance, and when the change relating to the value of the share is a second change, the asset is modified such that the associated digital asset to have a second appearance different than the first appearance.

11. The non-transitory computer-readable medium of claim 10, wherein the token comprises at least one of a non-fungible token (NFT) or a semi-fungible token, and wherein the associated digital asset comprises content relating to the share of the entity.

12. The non-transitory computer-readable medium of claim 10, wherein the first change is the value of the share falling, and the second change is the value of the share rising.

13. The non-transitory computer-readable medium of claim 10, wherein the share comprises a share of stock of the entity.

14. The non-transitory computer-readable medium of claim 10, the method further comprising:

determining that the recipient maintains ownership of the first asset share at a second time, later than a first time at which the asset is distributed to the recipient; and based on the determining that the recipient maintains ownership of the share at the second time, performing at least one of: (i) modifying the associated digital asset, or (ii) distributing a third digital asset to the recipient.

15. The non-transitory computer-readable medium of claim 14, wherein the associated digital asset comprises a first one or more images depicting content relating to the share of the entity, and wherein the third digital asset comprises a second one or more images relating to the content depicted in the first one or more images.

16. A system comprising:

a computer processor; and a memory having instructions stored thereon;

the computer processor configured to execute the instructions to:

determine that a recipient owns a share of an entity;

generate an asset relating to the share of the entity, wherein the asset comprises a token and an associated digital asset, and wherein information relating to the asset is recorded in a blockchain;

distribute the asset to the recipient;

record, in the blockchain, data relating to distributing the asset to the recipient; and modify the asset based on a change in a value of the share, wherein when the change relating to the value of the share is a first change, the asset is modified such that the associated digital asset to have a first appearance, and when the change relating to the value of the share is a second change, the asset is modified such that the associated digital asset to have a second appearance different than the first appearance.

17. The system of claim 16, wherein the token comprises at least one of a non-fungible token (NFT) or a semi-fungible token, and wherein the associated digital asset comprises content relating to the share of the entity.

18. The system of claim 16, wherein the first change is the value of the share falling, and the second change is the value of the share rising.

19. The system of claim 16, wherein the first asset share comprises a share of stock of the entity.

20. The system of claim 16, wherein the computer processor is further configured to execute the instructions to:

determine that the recipient maintains ownership of the share at a second time, later than a first time at which the asset is distributed to the recipient; and based on determining that the recipient maintains ownership of the share at the second time, perform at least one of: (i) modifying the associated digital asset, or (ii) distributing a third digital asset to the recipient.

* * * * *